No. 699,770. Patented May 13, 1902.
M. F. & C. STEPHENS.
ATTACHMENT FOR WINDOW SHADES.
(Application filed Mar. 10, 1902.)
(No Model.)
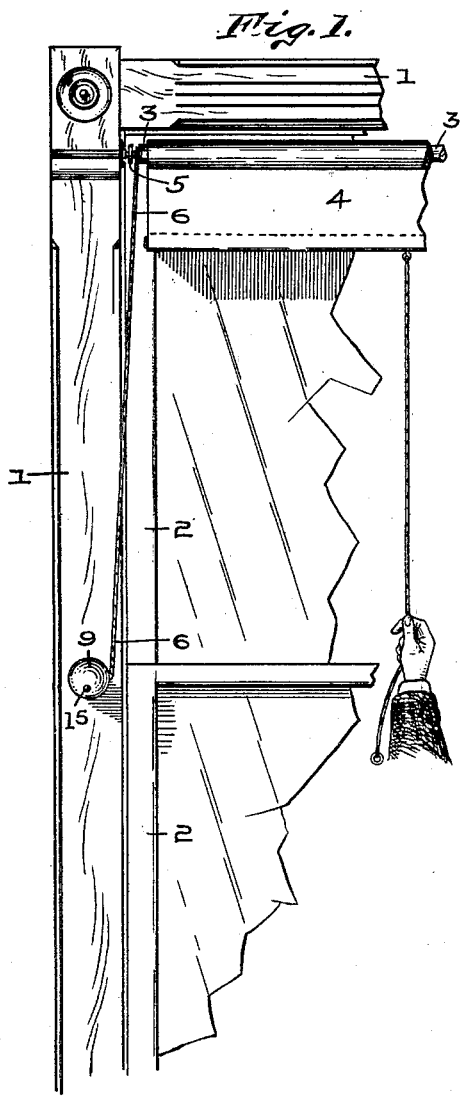
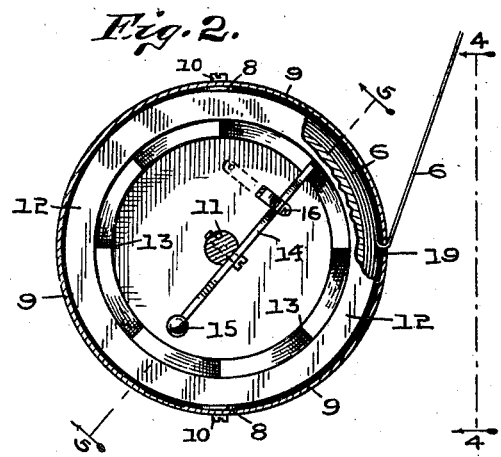
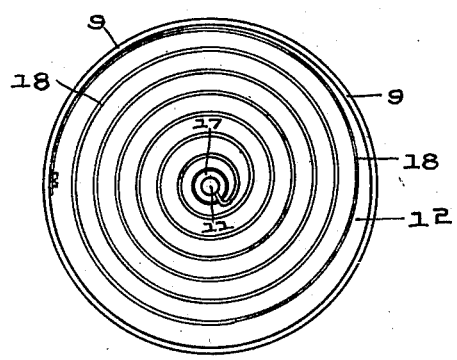
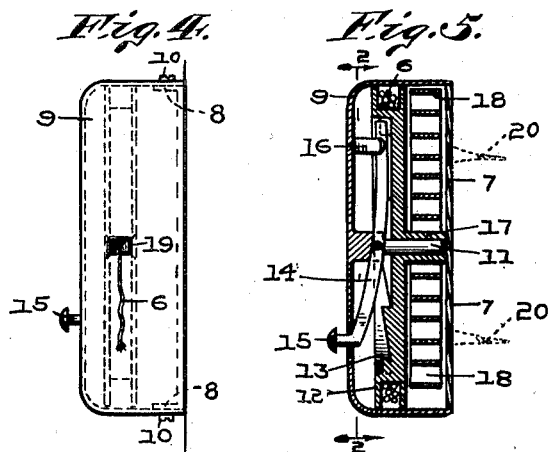
WITNESSES:
C. C. Topp
L. E. Woerner
INVENTORS.
Marcus F. Stephens
and Cyrus Stephens,
BY
Frank W. Woerner,
ATTORNEY.
THE NORRIS PETERS CO., PHOTO-LITHO., WASHINGTON, D. C.

UNITED STATES PATENT OFFICE.

MARCUS F. STEPHENS AND CYRUS STEPHENS, OF INDIANAPOLIS, INDIANA.

ATTACHMENT FOR WINDOW-SHADES.

SPECIFICATION forming part of Letters Patent No. 699,770, dated May 13, 1902.

Application filed March 10, 1902. Serial No. 97,636. (No model.)

*To all whom it may concern:*

Be it known that we, MARCUS F. STEPHENS and CYRUS STEPHENS, citizens of the United States, residing at Indianapolis, in the county of Marion and State of Indiana, have invented certain new and useful Improvements in Attachments for Window-Shades, of which the following is a specification.

Our invention relates to an improvement in a device for raising window-shades, the object being to provide a device which will be simple in construction, easy to operate, and one which can be easily fixed to any window-casing.

The object consists, further, in a device which shall be so constructed that the mechanism will be incased and variously designed, so as to appear neat and ornamental. There are other features, and the arrangement and construction of the several parts will be hereinafter more particularly described and then pointed out in the claim.

Referring to the accompanying drawings, which are made a part hereof and on which similar numerals of reference indicate similar parts, Figure 1 is a fragmentary detail view of a window and shows our invention in operating position. Fig. 2 is a vertical section of the shell of our shade-raising device, in which the internal pawl and rack are shown, the said figure being as seen when looking in the direction indicated by the arrows on the line 2 2 in Fig. 5. Fig. 3 is a rear view of our device with the base-plate removed, thereby disclosing the internal spring which actuates the spool. Fig. 4 is a side elevation of our invention and shows the knob for actuating the internal pawl and also shows the aperture in the shell through which the cord passes, and Fig. 5 is a sectional view as seen when looking in the direction indicated by the arrows on the line 5 5 in Fig. 2.

In the drawings, 1 is the window-casing, and 2 the sash; 3, the ordinary shade-roller; 4, the shade. The roller 3 is provided with a spool 5 at the end next the casing, where our device is secured. The rollers 3 are provided at the ends with pins in the ordinary way, which act as pivots for the roller. A cord 6 leads from the spool 5, secured to the end of the roller 3, to a spool mounted within our shade-rolling device, and as the cord 6 is unwound from the spool 5 it is wound on the spool within the raising device, and vice versa.

The spool-housing 9 of our device is composed of the base-plate 7, which carries the integral ears 8. The ears 8 are bent at right angles from the base. The ears carry a threaded aperture which receives the screws 10, which pass through the housing 9 and whereby the base 7 and the housing are secured together.

The housing 9 is preferably made of light material, such as tin, and is ornamented by any suitable embossed design. The housing 9 has an internal centrally-located post 11, which post is rigidly secured thereto and which forms a bearing for the pawl and spool. The post 11 has an extended base, which forms a shoulder against which the spool rests. A spool 12 is provided on its front surface with an integrally-formed ratchet 13, which is recessed into said spool. A pawl 14, which is pivotally secured to the post 11, engages at its front end with the ratchet 13, and at its rear end it turns upward and forms a button or knob 15, the said knob projecting through the housing 9 and provides a means for actuating the pawl. A leaf-spring 16 is secured to the inner surface of the housing, the free end of the spring resting on the pawl 14 and whereby the pawl is constantly held in contact with the ratchet 13 unless released by pressing on the knob 15. The spool 12 fits snugly within the housing 9. The groove in the spool 12 registers with the aperture 19 in the housing. The aperture 19 acts as a guide for the cord 6 as it is fed to or from the spool 12. The relative position of the spool 12 and aperture is clearly shown by dotted lines in Fig. 4. The spool 12 has a centrally-located aperture through which the post 11 projects and on which post the spool revolves. The spool 12 has an integrally-formed sleeve 17 on the rear surface, and the central aperture of the spool passes through said sleeve. As shown in Fig. 3, the sleeve 17 has a vertical slit therein and in which the inner end of the spring 18 is secured. The spring 18 coils around the sleeve, the outer end of the spring being secured to the spool-housing 9. This construction allows the spool to turn when the pawl 14 is actuated.

In placing our invention in operation the base-plate 7 is secured to the window-casing by means of the screws 20. The housing 9, carrying the spool 12, spring 18, and pawl 14, is placed into position. The peripheral edge of the housing 9 fits over the periphery of the base-plate 7, which are held together by the screws 10, which pass through the housing and into the ears 8 on the base-plate 7. The spool-housing 9 may be mounted on the window-casing at any desirable point along the length of the window. It may be fixed near the bottom, or where children abide the same may be fixed at a point inaccessible to them.

When the housing 9 is placed into position, the spring 18 is expanded and the spool 12 is filled with cord. The window-shade 4 is fully wound on the roller 3, which roller is now placed into position in the usual manner. The end of the cord 6 is secured to the spool 5, which is secured to the roller 3, and at the completion of said operation our device is in working order. When the shade 4 is pulled downward, the cord 6 is unwound from the spool 12 and is wound around the spool 5 on the roller 3. The operation while unwinding the cord 6 from the roller 12 winds up the spring 18, so that when the shade 4 is pulled down its full length the spring 18 is wound tight. When it is desired to raise the window-shade 4, the pawl 14 is released from the ratchet 13 by pressing on the knob 15, which movement sets the spool 12 in motion under the tension of the spring 18. The cord 6 unwinds from the spool 5 while the shade 4 raises and is again wound on the spool 12. The diversity between the spools 5 and 12 allows for about a four-inch rise of the shade 4 to every inch of rotation of the spool 12. This diversity may be increased or decreased, if desired.

Having thus fully described our said invention, what we desire to secure by Letters Patent is—

In a shade-rolling device, a base-plate having integrally-formed ears which carry threaded apertures, a spool-housing adapted to overlie the said base, screws passing through the said housing and engaging with the apertures in the ears on the base-plate, a post integral with the housing and centrally mounted therein and which forms a bearing for the spool, a spool on the post which carries an integral recessed ratchet on one side, an integrally-formed sleeve on the other, the said sleeve forming a bearing for the spring, a spring secured to the sleeve and spool-housing, a pawl pivotally secured to the central post, the said pawl engaging at one end with the ratchet on the spool while the other end thereof is bent at right angle from the main body and formed into a knob, a leaf-spring secured to the spool-housing the free end of which rests on the pawl, whereby the said pawl is held into contact with the ratchet, a cord extending from the spool in the housing and engaging with the secondary spool secured to the shade-roller, whereby a means is provided for actuating the window-shade, substantially as shown and described.

In witness whereof we have hereunto set our hands and seals, at Indianapolis, Indiana, this 17th day of February, A. D. 1902.

MARCUS F. STEPHENS. [L. S.]
CYRUS STEPHENS. [L. S.]

Witnesses:
C. C. TOPP,
F. W. WOERNER.